US012768095B2

(12) United States Patent
Gangadhari et al.

(10) Patent No.: US 12,768,095 B2
(45) Date of Patent: Oct. 20, 2026

(54) WASHING MACHINE APPLIANCE WITH A REMOVABLE FILTERING AGITATOR

(71) Applicant: Haier US Appliance Solutions, Inc., Wilmington, DE (US)

(72) Inventors: Umesh Babu Gangadhari, Hyderabad (IN); Pavan Kumar Madeti, Hyderabad (IN)

(73) Assignee: Haier US Appliance Solutions, Inc., Wilmington, DE (US)

(*) Notice: Subject to any disclaimer, the term of this patent is extended or adjusted under 35 U.S.C. 154(b) by 105 days.

(21) Appl. No.: 18/990,090

(22) Filed: Dec. 20, 2024

(65) Prior Publication Data

US 2026/0176808 A1 Jun. 25, 2026

(51) Int. Cl.

| | |
|---|---|
| ***D06F 39/10*** | (2006.01) |
| ***B01D 33/11*** | (2006.01) |
| ***B01D 33/72*** | (2006.01) |
| ***D06F 23/04*** | (2006.01) |
| ***D06F 37/12*** | (2006.01) |

(52) U.S. Cl.

CPC .............. *D06F 39/10* (2013.01); *B01D 33/11* (2013.01); *B01D 33/722* (2013.01); *D06F 23/04* (2013.01); *D06F 37/12* (2013.01); *B01D 2201/302* (2013.01); *B01D 2201/304* (2013.01); *B01D 2201/325* (2013.01); *B01D 2201/34* (2013.01)

(58) Field of Classification Search

CPC .......... D06F 39/10; D06F 23/04; D06F 37/12; B01D 33/11; B01D 33/722; B01D 2201/302; B01D 2201/304; B01D 2201/325; B01D 2201/34

See application file for complete search history.

(56) References Cited

U.S. PATENT DOCUMENTS

| | | | | |
|---|---|---|---|---|
| 3,027,742 | A | 4/1962 | Nowicki | |
| 3,381,505 | A * | 5/1968 | Smith | D06F 13/00 68/53 |
| 11,932,979 | B2 * | 3/2024 | Andrejczuk | D06F 17/10 |
| 11,982,039 | B2 | 5/2024 | Bixby et al. | |
| 12,595,613 | B2 * | 4/2026 | Gangadhari | D06F 13/06 |
| 12,595,617 | B2 * | 4/2026 | Attar | D06F 39/10 |
| 2022/0235512 | A1 * | 7/2022 | Bixby | D06F 39/10 |
| 2022/0290357 | A1 | 9/2022 | Bhavsar et al. | |
| 2023/0160133 | A1 | 5/2023 | Campos et al. | |
| 2025/0198066 | A1 * | 6/2025 | Afajalpurkar | D06F 17/10 |

FOREIGN PATENT DOCUMENTS

| | | |
|---|---|---|
| CN | 202208836 U | 5/2012 |
| CN | 208250714 U | 12/2018 |
| KR | 20050050290 A | 5/2005 |

* cited by examiner

*Primary Examiner* — Michael E Barr
(74) *Attorney, Agent, or Firm* — Dority & Manning, P.A.

(57) ABSTRACT

A washing machine appliance includes a tub, a basket rotatably positioned within the tub, and an impeller base rotatably mounted within the basket and defining a rotation axis. The washing machine appliance also includes an extended post removably attached to the impeller base and configured to rotate therewith. The extended post defines an inlet and an outlet. The extended post includes a connector column extending along the rotation axis between a bottom end proximal to the impeller base and a top end distal to the impeller base. The connector column includes a filtration wall that defines a filtration chamber. A shader collar is disposed about the connector column. The extended post also includes a trap positioned at the top end of the connector column.

20 Claims, 16 Drawing Sheets

WASHING MACHINE APPLIANCE WITH A REMOVABLE FILTERING AGITATOR

FIELD OF THE INVENTION

The present subject matter relates generally to washing machine appliances and an agitation element for the same.

BACKGROUND OF THE INVENTION

A vertical axis washing machine appliance generally includes a tub with a basket rotatably positioned within the tub. Articles to be washed, such as clothes, are placed in the machine's basket. An agitation element can be included in the tub, and can rotate to move articles within the basket to facilitate washing. Agitation elements are typically impellers, single-action agitation elements, or dual-action agitation elements. Generally, such an agitation element reciprocates about a rotation axis (e.g., vertical axis) within the machine's basket. In some instances, fins extend from a rigid shaft of the agitation element to contact and move the articles. The surface of the basket and gravity may be used in conjunction with such agitation elements to impart a circular motion of the articles, known as "turnover," from a top of the basket, to a bottom of the basket, and back up to the top of the basket.

Some washing machine appliances may include a drain filter to capture foreign particles, such as lint, however, finer particles, such as hair, pet hair, or the like, may not flow to the drain filter, as finer particles may get stuck onto clothes during the wash cycle. The appearance of particles on articles in the basket may affect the perceived quality of the washing machine appliance.

As such, it may be advantageous to provide a washing machine appliance or assembly wherein an agitation element (or portions thereof) could aid in filtering particles from the machine's basket during washing operations or wash cycles.

BRIEF DESCRIPTION OF THE INVENTION

Aspects and advantages of the invention will be set forth in part in the following description, or may be obvious from the description, or may be learned through practice of the invention.

In one example embodiment, a washing machine appliance is provided. The washing machine appliance includes a tub, a basket rotatably positioned within the tub, and an impeller base rotatably mounted within the basket and defining a rotation axis. The impeller base includes one or more impeller fins extending radially outward from the rotation axis, and a mounting face disposed radially inward from the one or more impeller fins. The mounting face includes a central bracket defining a mounting channel having an axial portion and a radial portion extending along the mounting face. An impeller cap is slidably seated within the central bracket and biased upwardly. The washing machine appliance also includes an extended post removably attached to the impeller base and configured to rotate therewith. The extended post defines an inlet and an outlet. The extended post includes a connector column extending along the rotation axis between a bottom end proximal to the impeller base and a top end distal to the impeller base. The connector column includes a filtration wall that defines a filtration chamber, and a shader collar is disposed about the connector column. The extended post also includes a trap positioned at the top end of the connector column.

In another example embodiment, a washing machine appliance is provided. The washing machine appliance includes a tub, a basket rotatably positioned within the tub, and an impeller base rotatably mounted within the basket and defining a rotation axis. The washing machine appliance also includes an extended post removably attached to the impeller base and configured to rotate therewith. The extended post defines an inlet and an outlet. The extended post includes a connector column extending along the rotation axis between a bottom end proximal to the impeller base and a top end distal to the impeller base. The connector column includes a filtration wall that defines a filtration chamber. A shader collar is disposed about the connector column. The extended post also includes a trap positioned at the top end of the connector column.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
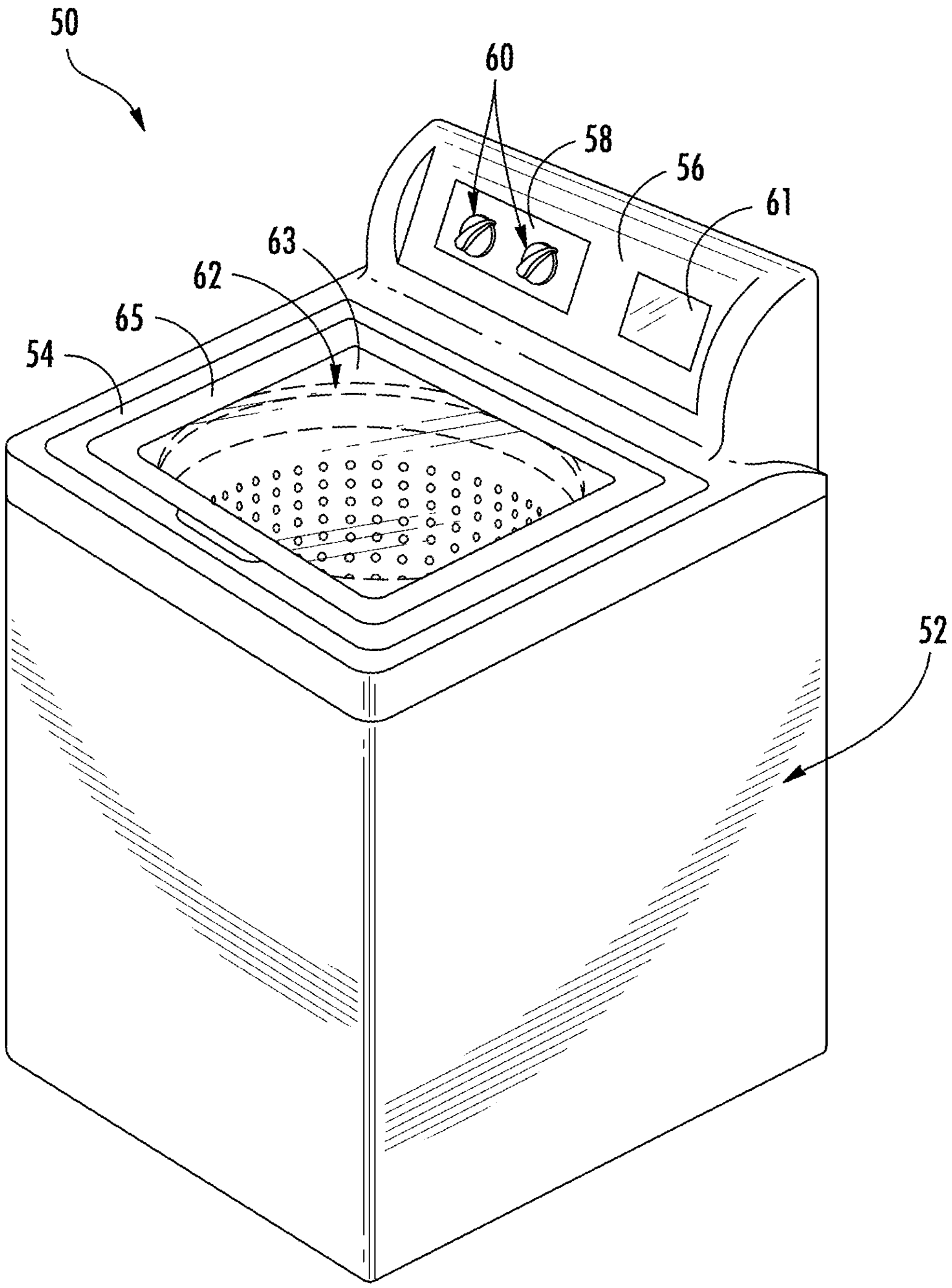
FIG. 1 provides a perspective view of a washing machine appliance according to example embodiments of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents. The word "example" is used herein to mean "serving as an example, instance, or illustration." In addition, references to "an embodiment" or "one embodiment" does not necessarily refer to the same embodiment, although it may. Any implementation described herein as "example" or "an embodiment" is not necessarily to be construed as preferred or advantageous over other implementations.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

Except as explicitly indicated otherwise, recitation of a singular processing element (e.g., "a controller," "a processor," "a microprocessor," etc.) is understood to include more than one processing element. In other words, "a processing element" is generally understood as "one or more processing element." Furthermore, barring a specific statement to the contrary, any steps or functions recited as being performed by "the processing element" or "said processing element" are generally understood to be capable of being performed by "any one of the one or more processing elements." Thus, a first step or function performed by "the processing element" may be performed by "any one of the one or more processing elements," and a second step or function performed by "the processing element" may be performed by "any one of the one or more processing elements and not necessarily by the same one of the one or more processing elements by which the first step or function is performed." Moreover, it is understood that recitation of "the processing element" or "said processing element" performing a plurality of steps or functions does not require that at least one discrete processing element be capable of performing each one of the plurality of steps or functions.

Figure 2:
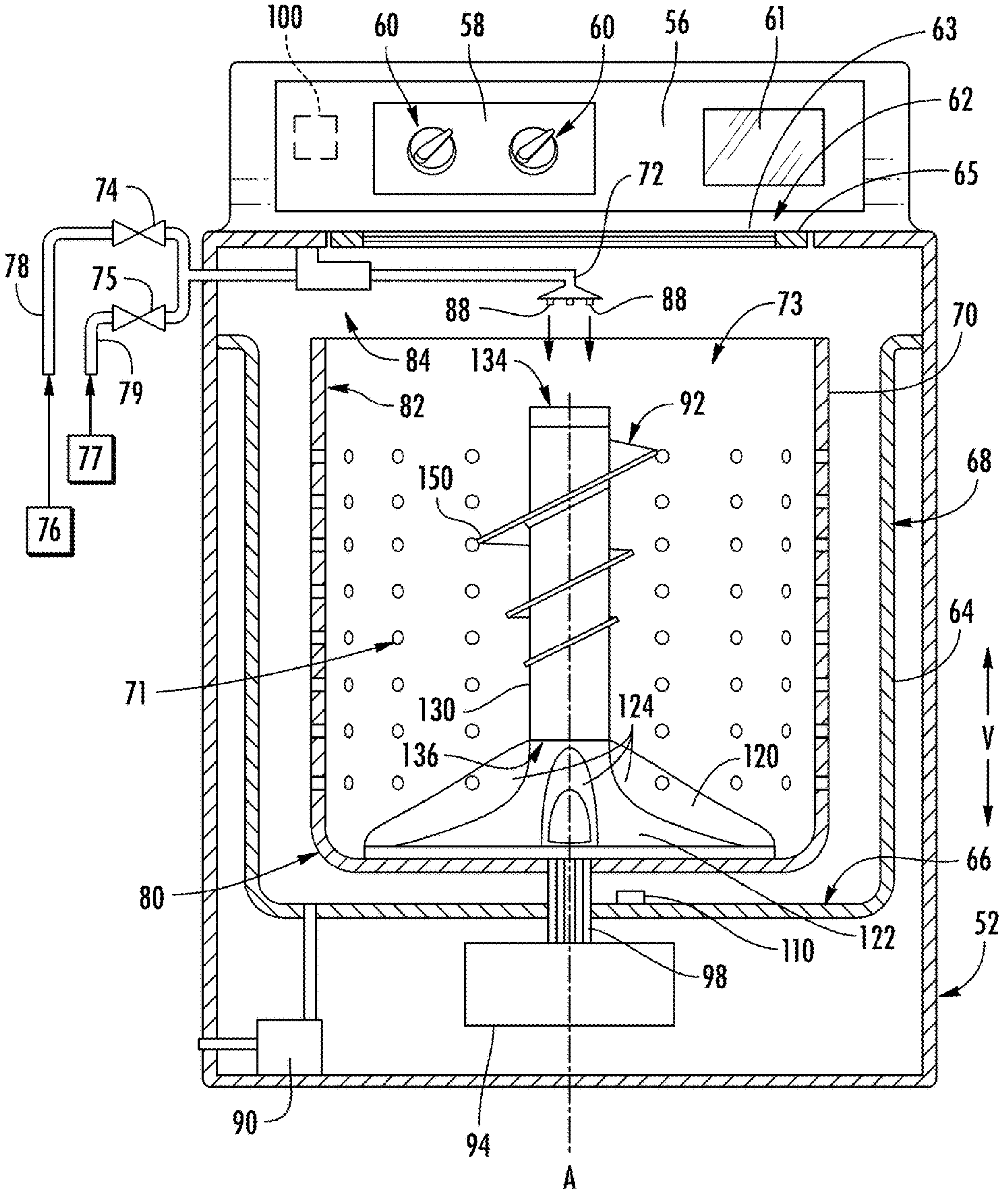
FIG. 2 provides a sectional elevation view of the example washing machine appliance of FIG. 1.

Turning now to the figures, FIGS. 1 and 2 provide separate views of a washing machine appliance 50 according to example embodiments of the present disclosure. As shown, washing machine appliance 50 generally defines a vertical direction V, a lateral direction L, and a transverse direction T. The vertical direction V, lateral direction L, and transverse direction T are each mutually perpendicular and form an orthogonal direction system.

Washing machine appliance 50 may include a cabinet 52 and a cover 54. A backsplash 56 extends from cover 54, and a control panel 58, including a plurality of input selectors 60, is coupled to backsplash 56.

Control panel 58 and input selectors 60 collectively form a user interface input for operator selection of machine cycles and features, and in one embodiment, a display 61 indicates selected features, a countdown timer, or other items of interest to machine users. It should be appreciated, however, that in other example embodiments, the control panel 58, input selectors 60, and display 61, may have any other suitable configuration. For example, in other example embodiments, one or more of the input selectors 60 may be configured as manual "push-button" input selectors, or alternatively may be configured as a touchscreen (e.g., on display 61).

A lid 62 may be mounted to cover 54 and rotatable between an open position (not shown) facilitating access to a tub, also referred to as a wash tub, 64 located within cabinet 52 and a closed position (FIG. 1) forming an enclosure over tub 64. Lid 62 in example embodiment includes a transparent panel 63, which may be formed of, for example, glass, plastic, or any other suitable material. The transparency of the panel 63 allows users to see through the panel 63, and into the tub 64 when the lid 62 is in the closed position. In some embodiments, the panel 63 itself can generally form the lid 62. In other embodiments, the lid 62 includes the panel 63 and a frame 65 surrounding and encasing the panel 63. Alternatively, panel 63 need not be transparent.

As may be seen in FIG. 2, tub 64 includes a bottom wall 66 and a sidewall 68. A wash drum or basket 70 is rotatably mounted within tub 64. In particular, basket 70 is rotatable about a central axis, which may when properly balanced and positioned in the embodiment illustrated be a vertical axis. Thus, washing machine appliance is generally referred to as a vertical axis washing machine appliance. Basket 70 defines a wash chamber 73 for receipt of articles for washing and extends, for example, vertically, between a bottom portion 80 and a top portion 82. Basket 70 includes a plurality of openings or perforations 71 therein to facilitate fluid communication between an interior of basket 70 and tub 64.

A nozzle 72 is configured for flowing a liquid into tub 64. In particular, nozzle 72 may be positioned at or adjacent to top portion 82 of basket 70. Nozzle 72 may be in fluid communication with one or more water sources 76, 77 in order to direct liquid (e.g., water) into tub 64 or onto articles within chamber 73 of basket 70. Nozzle 72 may further include apertures 88 through which water may be sprayed into the tub 64. Apertures 88 may, for example, be tubes extending from the nozzles 72 as illustrated, or simply holes defined in the nozzles 72 or any other suitable openings through which water may be sprayed. Nozzle 72 may additionally include other openings, holes, etc. (not shown) through which water may be flowed (i.e., sprayed or poured) into the tub 64.

Various valves may regulate the flow of fluid through nozzle 72. For example, a flow regulator may be provided to control a flow of hot or cold water into the wash chamber of washing machine appliance 50. For the embodiment depicted, the flow regulator includes a hot water valve 74 and a cold water valve 75. The hot and cold water valves 74, 75 are used to flow hot water and cold water, respectively, therethrough. Each valve 74, 75 can selectively adjust to a closed position in order to terminate or obstruct the flow of fluid therethrough to nozzle 72. The hot water valve 74 may be in fluid communication with a hot water source 76, which may be external to the washing machine appliance 50. The cold water valve 75 may be in fluid communication with a cold water source 77, which may be external to the washing machine appliance 50. The cold water source 77 may, for example, be a commercial water supply, while the hot water source 76 may be, for example, a water heater. Such water sources 76, 77 may supply water to the appliance 50 through the respective valves 74, 75. A hot water conduit 78 and a cold water conduit 79 may supply hot and cold water, respectively, from the sources 76, 77 through the respective valves 74, 75 and to the nozzle 72.

An additive dispenser 84 may additionally be provided for directing a wash additive, such as detergent, bleach, liquid fabric softener, etc., into the tub 64. For example, dispenser 84 may be in fluid communication with nozzle 72 such that water flowing through nozzle 72 flows through dispenser 84, mixing with wash additive at a desired time during operation to form a liquid or wash fluid, before being flowed into tub 64. For the embodiment depicted, nozzle 72 is a separate downstream component from dispenser 84. In other example embodiments, however, nozzle 72 and dispenser 84 may be integral, with a portion of dispenser 84 serving as the nozzle 72, or alternatively dispenser 84 may be in fluid communication with only one of hot water valve 74 or cold water valve 75. In still other example embodiments, the washing machine appliance 50 may not include a dispenser, in which case a user may add one or more wash additives directly to wash chamber 73. A pump assembly 90 (shown schematically in FIG. 2) is located beneath tub 64 and basket 70 for gravity assisted flow to drain tub 64.

As will be described in greater detail herein, an agitation element 92 is oriented to rotate about the rotation axis A (e.g., parallel to the vertical direction V). Generally, agitation element 92 includes an impeller base 120 and extended post 130. The agitation element 92 depicted is positioned within the basket 70 to impart motion to the articles and liquid in the chamber 73 of the basket 70. More particularly, the agitation element 92 depicted is provided to impart downward motion of the articles along the rotation axis A. For example, with such a configuration, during operation of the agitation element 92 the articles may be moved downwardly along the rotation axis A at a center of the basket 70, outwardly from the center of basket 70 at the bottom portion 80 of the basket 70, then upwardly along the rotation axis A towards the top portion 82 of the basket 70.

In optional embodiments, basket 70 and agitation element 92 are both driven by a motor 94. Motor 94 may, for example, be a pancake motor, direct drive brushless motor, induction motor, or other motor suitable for driving basket 70 and agitation element 92. As motor output shaft 98 is rotated, basket 70 and agitation element 92 are operated for rotatable movement within tub 64 (e.g., about rotation axis A). Washing machine appliance 50 may also include a brake assembly (not shown) selectively applied or released for respectively maintaining basket 70 in a stationary position within tub 64 or for allowing basket 70 to spin within tub 64.

Various sensors may additionally be included in the washing machine appliance 50. For example, a pressure sensor 110 may be positioned in the tub 64 as illustrated or, alternatively, may be remotely mounted in another location within the appliance 50 and be operationally connected to tub 64 by a hose (not shown). Any suitable pressure sensor 110, such as an electronic sensor, a manometer, or another suitable gauge or sensor, may be used. The pressure sensor 110 may generally measure the pressure of water in the tub 64. This pressure can then be used to estimate the height or amount of water in the tub 64. Additionally, a suitable speed sensor can be connected to the motor 94, such as to the output shaft 98 thereof, to measure speed and indicate operation of the motor 94. Other suitable sensors, such as temperature sensors, water sensors, moisture sensors, etc., may additionally be provided in the washing machine appliance 50.

Operation of washing machine appliance 50 is controlled by a processing device or controller 100, that is operatively coupled to the input selectors 60 located on washing machine backsplash 56 for user manipulation to select washing machine cycles and features. Controller 100 may further be operatively coupled to various other components of appliance 50, such as the flow regulator (including valves 74, 75), motor 94, pressure sensor 110, other suitable sensors, etc. In response to user manipulation of the input selectors 60, controller 100 may operate the various components of washing machine appliance 50 to execute selected machine cycles and features.

While described in the context of specific embodiments of washing machine appliance 50, using the teachings disclosed herein it will be understood that washing machine appliance 50 is provided by way of example only. Other washing machine appliances having different configurations, different appearances, or different features may also be used with the present subject matter as well.

Turning now generally to FIGS. 2 through 17C, various embodiments of agitation element 92, including discrete portions thereof, are illustrated. In some embodiments, agitation element 92 may include or be provided as a removable agitation element having an extended post 130 selectively attached to (and removable from) impeller base 120. Generally, impeller base 120 includes an impeller platform 122 having one or more impeller fins 124 extending therefrom, as would generally be understood. In the illustrated embodiments, impeller base 120 includes four discrete impeller fins 124 that extends upward from impeller platform 122 and radially outward from rotation axis A. Nonetheless, it is understood that any suitable number of impeller fins 124 may be provided. When assembled, impeller base 120 is generally connected to or in mechanical communication with motor 94, such as through the output shaft 98. Thus, impeller base 120 may be rotated, oscillated, or otherwise motivated by motor 94 (e.g., during a washing operation or wash cycle, as directed by controller 100).

When assembled, extended post 130 may generally extend along the rotation axis A above the impeller base 120. Specifically, extended post 130 may extend along the rotation axis A between a bottom end 136 and a top end 134. As shown, and as will be described in greater detail below, extended post 130 may include a connector column 140 attached to a shader collar 142 or auger cap 144 between the top end 134 and the bottom end 136. Connector column 140 itself may include an upper column portion at a top end 141 of connector column 140 and a lower column portion that defines or has a smaller diameter than the diameter of the upper column portion. In turn, a downward-facing column flange 190 may be defined between the upper and lower column portion. A mating face 154 may be provided on or fixed to connector column 140 (e.g., at or below the lower column portion). Additionally, the upper column portion of connector column 140 may include a filtration wall 220 defining a filtration chamber 222, as will be explained in more detail below.

When assembled, extended post 130 may be mounted within wash chamber 73 such that bottom end 136 is attached or otherwise proximal to the impeller base 120 while top end 134 is held distal to impeller base 120. Between top end 134 and bottom end 136, one or more auger fins 150 (FIG. 2) may extend radially from extended post 130 (e.g., from an auger cap 144 to engage and agitate articles within wash chamber 73). In some of the illustrated embodiments, auger fin 150 is formed as a helical coil wrapped about extended post 130. Nonetheless, any suitable shape or number of auger fins may be provided in alternative embodiments, as would be understood. Moreover, with respect to FIGS. 3 through 15, it is noted that the agitator element 92 is shown without an auger fin only for the purposes of clarity to show other portions of the agitator element 92 and should not be considered as limiting to embodiments with any particular auger fin shape.

As shown, impeller base 120 may provide a mounting face 152 that selectively connects to the mating face 154 of extended post 130. Specifically, mounting face 152 may be disposed inward from the impeller fins 124. Thus, mounting face 152 may be located closer to rotation axis A than impeller fins 124. In some such embodiments, mounting face 152 is generally coaxial with rotation axis A (e.g., at a radial center of impeller base 120). At or within mounting face 152, impeller base 120 may include a central bracket 156 that defines a mounting channel 158. As shown, mounting channel 158 extends, in part, about the rotation axis A or a central passage 168 defined by central bracket 156 (e.g., parallel to the rotation axis A). For instance, mounting channel 158 may define an L-shaped groove having a vertical segment and a horizontal segment. As shown, the vertical segment may extend (e.g., downward, or parallel to the rotation axis A or vertical direction V) from an upper tip 164 and to the horizontal segment. The horizontal segment may extend (e.g., circumferentially, or perpendicular to the rotation axis A or vertical direction) from the vertical segment to a lower tip 162.

Extended post 130 may provide a complementary structure to engage or interlock with the mounting face 152 of impeller base 120. In some embodiments, extended post 130 includes a mating face 154 disposed on bottom end 136 to rest against or interlock with the mounting face 152. Specifically, mating face 154 may include or be defined by a mating collar 160 at bottom end 136. In some such embodiments, mating collar 160 extends (e.g., circumferentially) along and about the rotation axis A. Mating face 154 may, in turn, be directed radially outward away from rotation axis A. In some embodiments, mating face 154 includes a locator wing 166 selectively and slidably received within the mounting channel 158. Generally, locator wing 166 may be sized complementary to mounting channel 158 (e.g., to include a generally equal horizontal width to the vertical segment or a generally equal vertical height to the horizontal segment). As shown, the vertical segment of the mounting channel 158 may be axially open (e.g., at the upper tip 164) to permit the locator wing 166 while the horizontal segment of the mounting channel 158 may be closed (e.g., at the lower tip 162 distal from the vertical leg) to restrict or delimit the permitted rotation of mating face 154 within central bracket 156. In turn, locator wing 166 may be able to be vertically inserted and pushed axially along the vertical segment and rotated horizontally about the rotation axis A and along the horizontal segment. Thus, mating face 154 may be in selective engagement with mounting face 152 at the central bracket 156 or mounting channel 158.

In optional embodiments, an impeller cap 180 can be mounted on or included within impeller base 120 to cover central passage 168. By covering, central passage 168, impeller cap 180 may generally hide central passage 168 from a user's view or block it from contacting/receiving articles within wash chamber 73 when extended post 130 is removed from wash chamber 73. In some embodiments, impeller cap 180 is movably mounted on mounting face 152. Specifically, impeller cap 180 may be mounted to move axially along central passage 168 (e.g., along, or parallel to rotation axis A). For instance, impeller cap 180 may be mounted for movement (e.g., axial translation) within central passage 168. In some such embodiments, impeller cap 180 includes a cap cover 184 spanning central passage 168 and one or more radial arms 186 that extend radially outward from cap cover 184 to be slidably received or held within at least a portion (e.g., the vertical segment) of the L-shaped groove of mounting channel 158 and move therealong. In additional or alternative embodiments, one or more secondary slots 182 are defined within the central bracket 156 (e.g., independently of the mounting channel 158). Such secondary slots 182 may extend from a bottom channel end to a top channel end that is closed off and below the upper surface of the central bracket 156. One or more complementary cap tabs 170 may extend radially outward from cap cover 184 and each be received within a corresponding secondary slot 182. A bracket spring 224 (e.g., compression spring) may be seated within the central bracket 156 in biased engagement with the impeller cap 180 and bias the impeller cap 180 upward. In turn, impeller cap 180 may be motivated toward the upper surface of central bracket 156. Connector column 140 may, when assembled, rest on impeller cap 180. For instance, a force or pressure from the connector column 140 mounted to impeller base 120 may force impeller cap 180 downward within central bracket 156 while contact or engagement between the cap tab(s) 170 and upper slot end of the secondary slot(s) 182 may restrict the impeller cap 180 (e.g., when the extended post 130 and mating face 154 are removed from central bracket 156) from completely escaping or being removed from impeller base 120.

In some embodiments, connector column 140 is able to drive movement of mating face 154 (e.g., on or within mounting face 152). As shown, connector column 140 defines a cam groove 146 above the bottom end 136. Generally, cam groove 146 extends radially through a wall of connector column 140 and defines a cam path therealong. For instance, cam groove 146 may have multiple legs joined at a vertex. A left leg may extend from a left bottom seat 172 to an upper vertex 174 while a right leg extends from a right bottom seat 176 to the upper vertex 174. Between the left leg and the right leg, the cam groove 146 may define an upper seat 178 that is disposed below the upper vertex 174. As will be described in greater detail below, a follower pin 148 may be received within the cam groove 146 to move between left bottom seat 172 and upper seat 178 as well as between right bottom seat 176 and upper seat 178.

The shader collar 142 may be disposed about the connector column 140 (e.g., about an outer surface of connector column 140). Specifically, shader collar 142 may be disposed between the top end 134 and the bottom end 136. More particularly, shader collar 142 may be disposed above mating face 154 and below an uppermost end of connector column 140. An interior flange 188 of shader collar 142 may extend radially inward from an outer surface of shader collar 142 and be disposed at the lower column portion below the column flange 190. Although shader collar 142 may be attached to or engaged with connector column 140, shader collar 142 may be movable relative to the connector column 140. For instance, shader collar 142 may be permitted to move relative to connector column 140. In some such embodiments, shader collar 142 is axially slidable (e.g., for roto-translation along the rotation axis A such that shader collar 142 is able to move about and along at least a portion of rotation axis A).

Figure 16C:
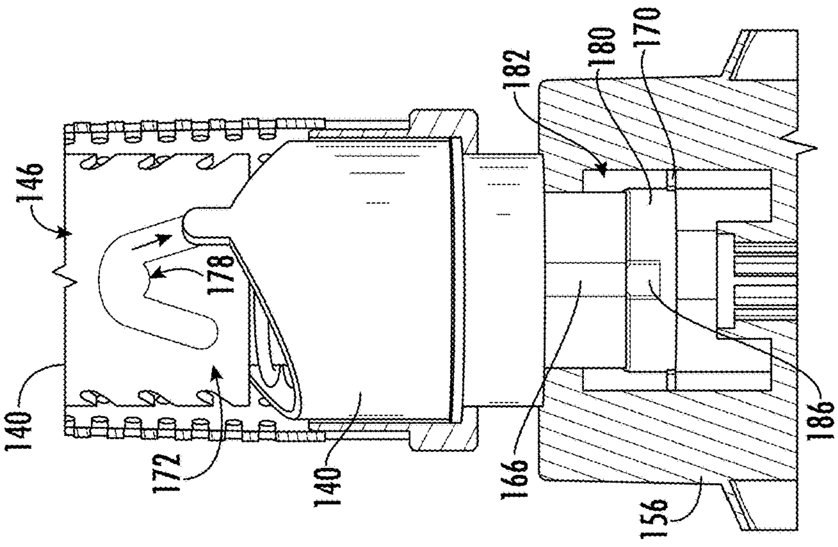
FIGS. 16A, 16B, and 16C provide magnified elevation views of a portion of the example agitation element of FIG. 3, wherein the extended post is moved sequentially on the impeller base from a first expanded position, to a compressed position, and to a second expanded position.
Figure 16B:
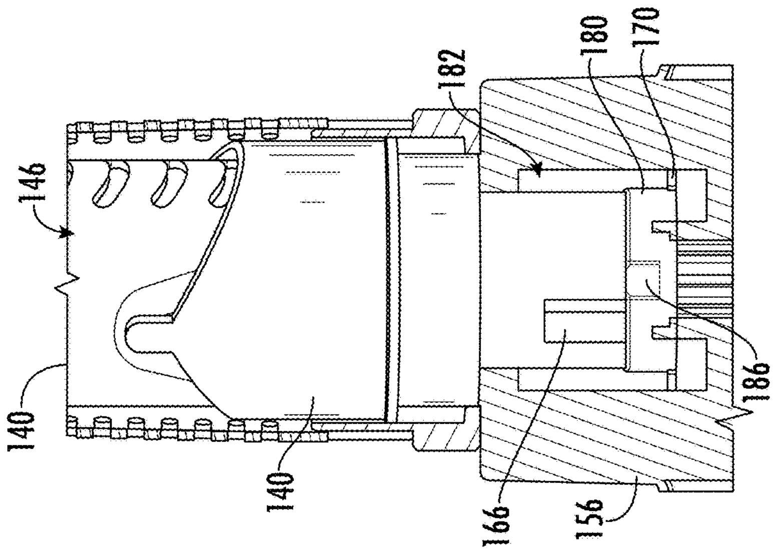
Figure 16A:
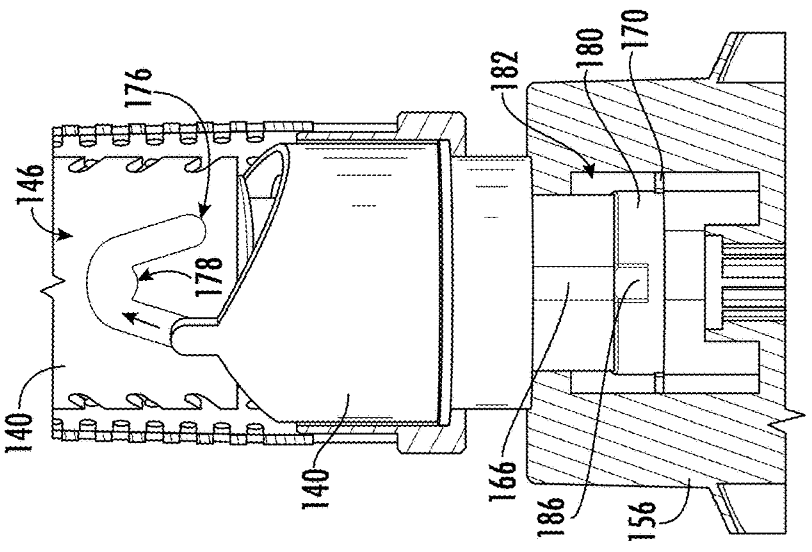
Figure 17C:
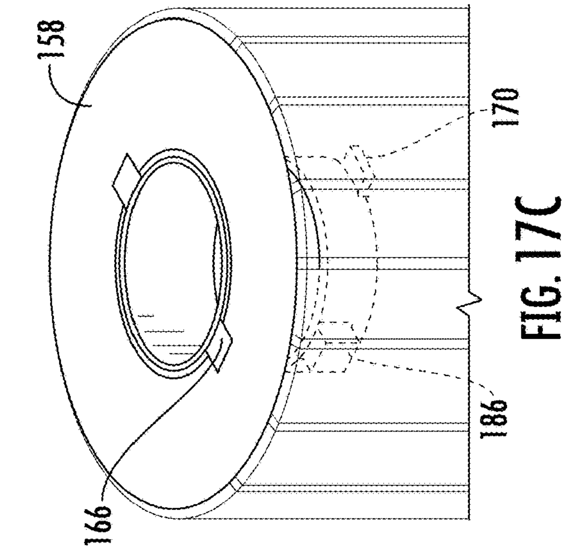
FIGS. 17A, 17B, and 17C provide magnified elevation views of a portion of the example agitation element of FIG. 3, wherein the extended post is moved sequentially on the impeller base from a first expanded position, to a compressed position, and to a second expanded position.
Figure 17B:
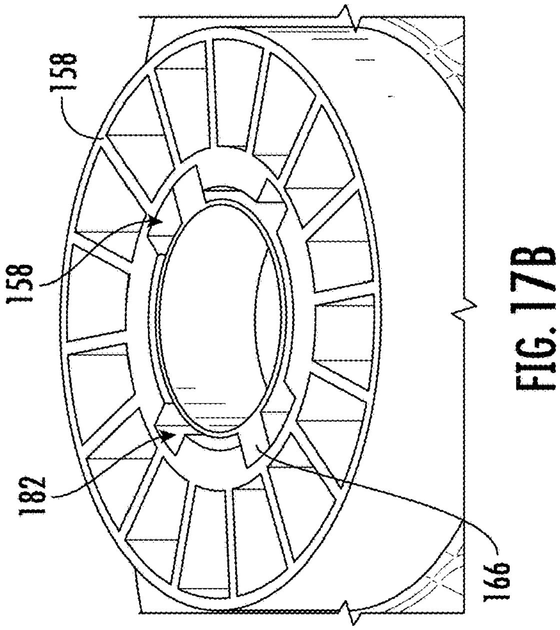
Figure 17A:
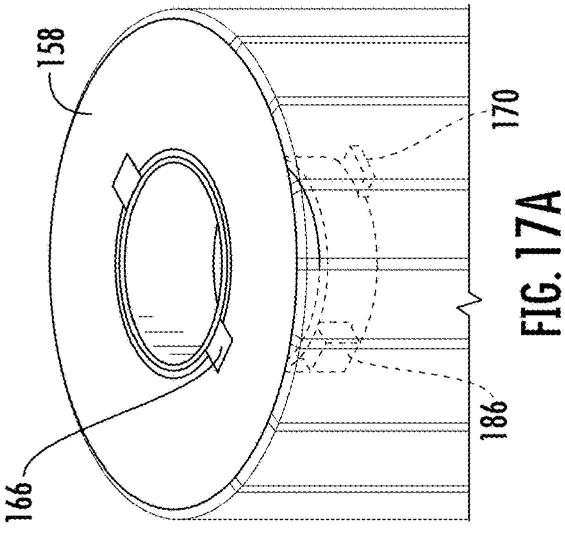

As shown, the follower pin 148 may be included with (e.g., fixed relative to) shader collar 142. In turn, relative movement of the shader collar 142 relative to connector column 140 (or vice versa) may be directed according to cam groove 146. In some embodiments, multiple discrete positions of shader collar 142 (e.g., relative to connector column 140) may be defined. For instance, turning especially to FIGS. 16A, 16B, and 16C, three positions may be defined, including a first expanded position (FIG. 16A), a contracted position (FIG. 16B), and a second expanded position (FIG. 16C). In the first expanded position, the follower pin 148 may rest against the left bottom seat 172, maintaining a relatively large axial distance between the bottom of the shader collar 142 (e.g., shown at interior flange 188) and the top of the connector column 140. In the contracted position, the follower pin 148 may rest against the upper seat 178 (e.g., defining a notch in which follower pin 148 may be cradled), maintaining a relatively small axial distance between the bottom of the shader collar 142 and the top of the connector column 140. In the second expanded position, the follower pin 148 may rest against the right bottom seat 176. Optionally, the axial position of the right bottom seat 176 may be the same as the left bottom seat 172. In turn, the axial distance maintained at the second expanded position may be the same as that maintained at the first expanded position.

Figure 7:
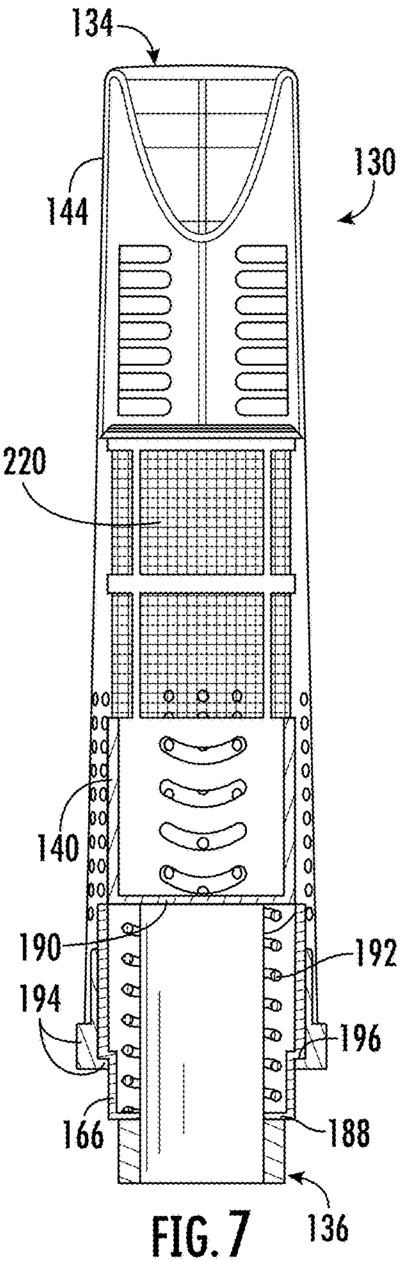
FIG. 7 provides a sectional view of a portion of an extended post of the example agitation element of FIG. 3.
Figure 8:
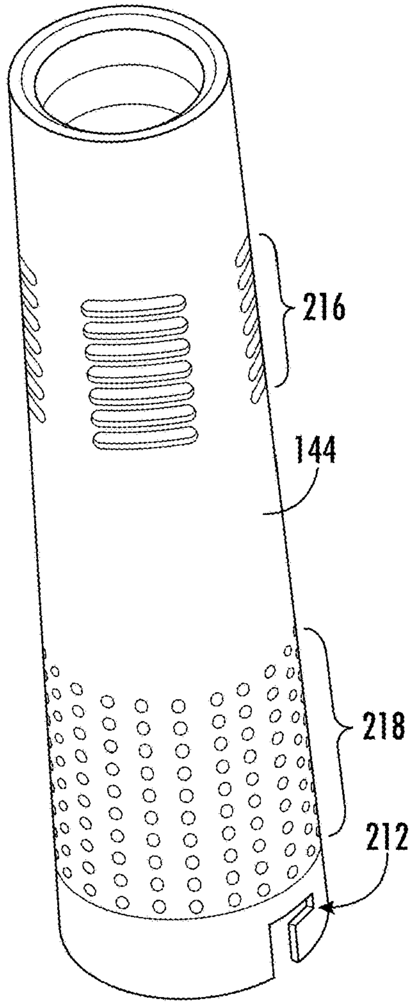
FIG. 8 provides a perspective view of an agitator cap of the example agitation element of FIG. 3.
Figure 9:
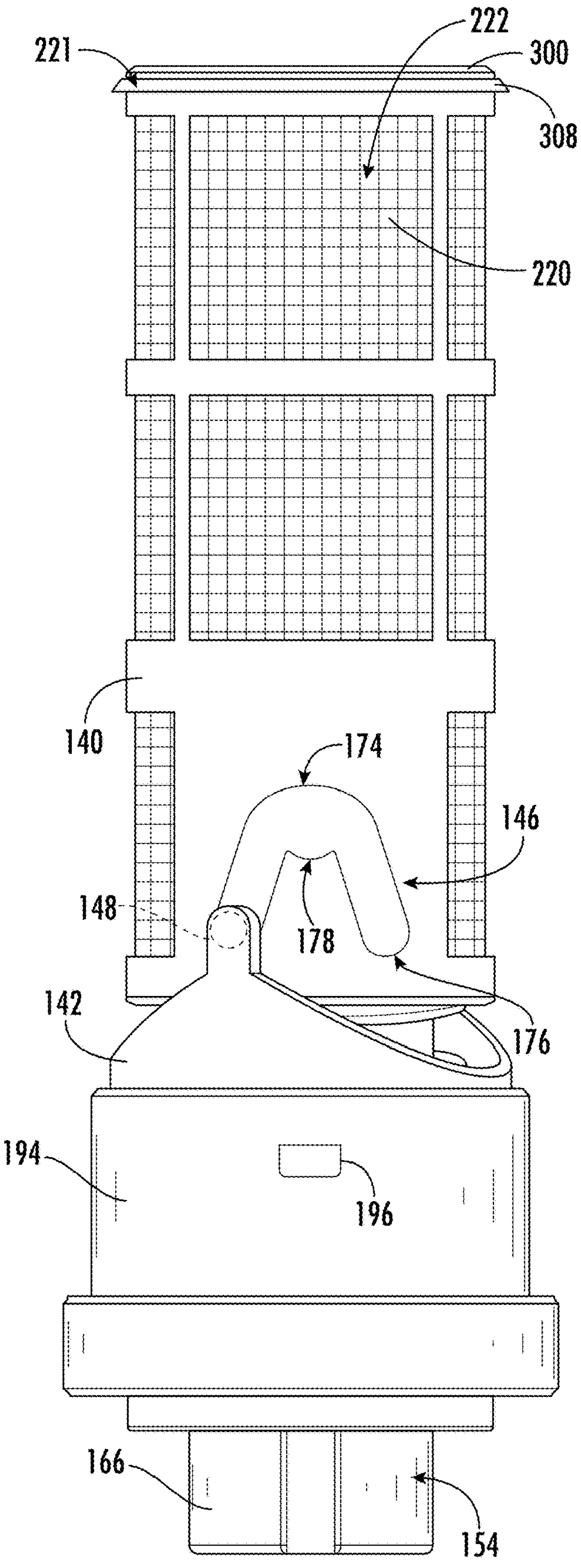
FIG. 9 provides an elevation view of a portion of an extended post of the example agitation element of FIG. 3, wherein the extended post is in an expanded position.
Figure 10:
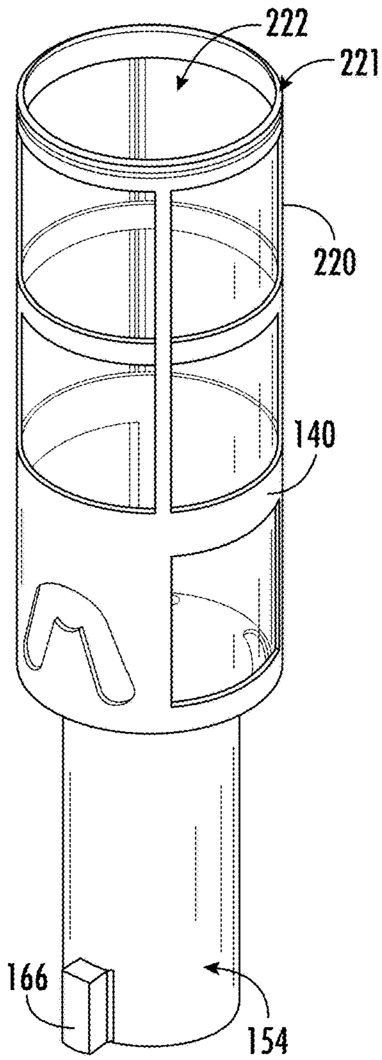
FIG. 10 provides a perspective view of a connector column of the example agitation element of FIG. 3.
Figure 11:
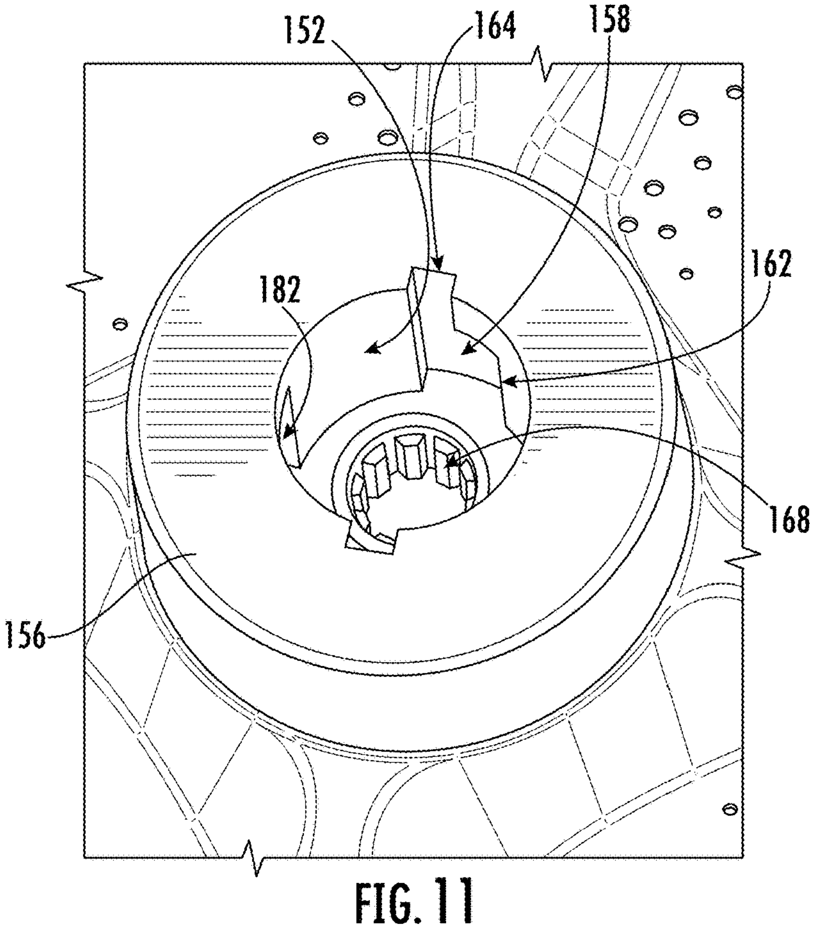
FIG. 11 provides a perspective view of a portion of an impeller base of the example agitation element of FIG. 3.
Figure 12:
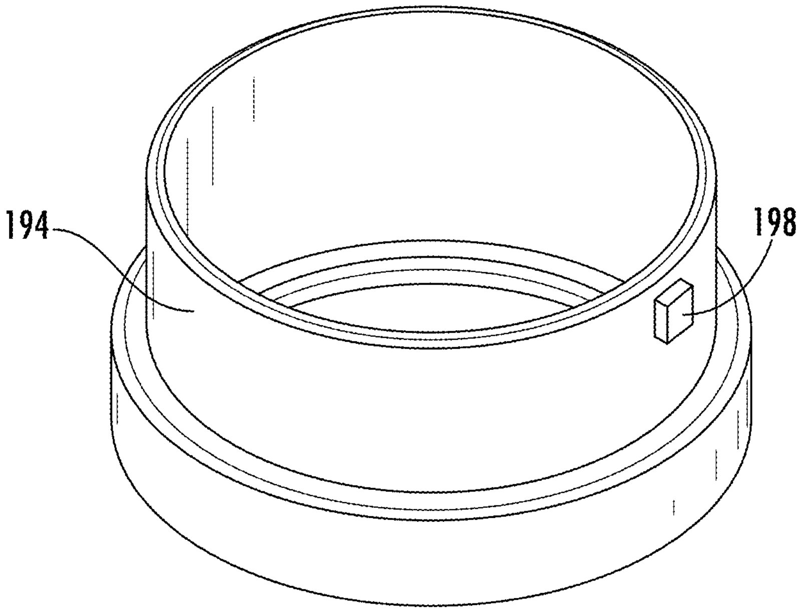
FIG. 12 provides a perspective view of an auger collar of the example agitation element of FIG. 3.
Figure 13:
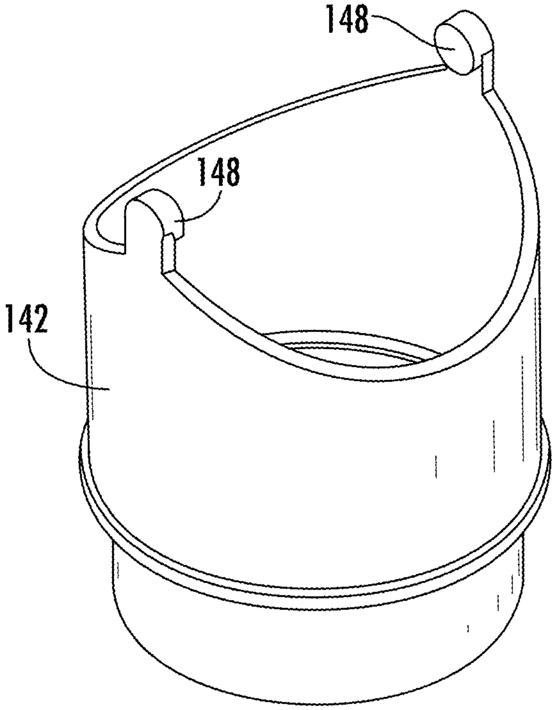
FIG. 13 provides a perspective view of a shader collar of the example agitation element of FIG. 3.
Figure 14:
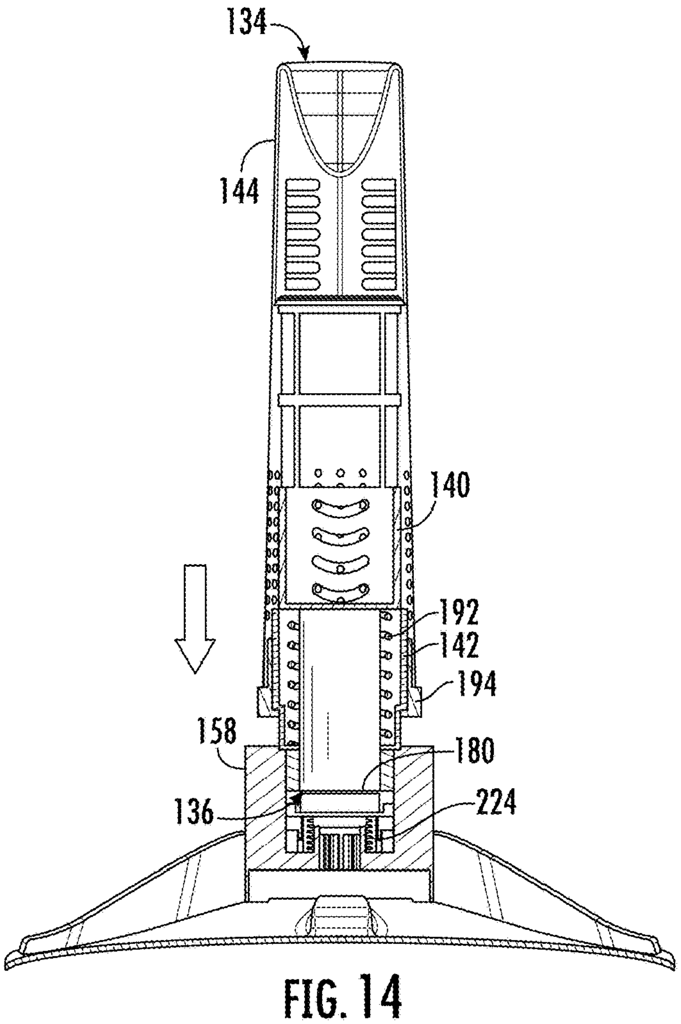
FIG. 14 provides an elevation view of the example agitation element of FIG. 3, wherein the extended post is in an expanded position.
Figure 15:
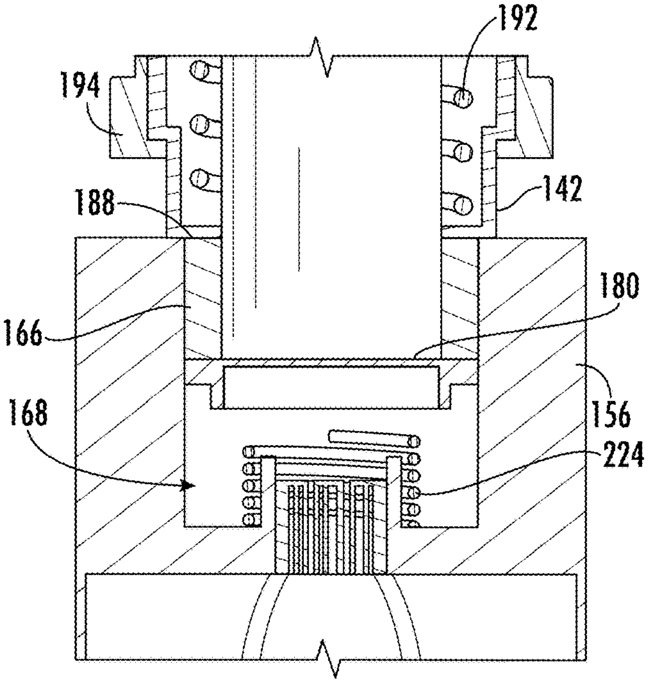
FIG. 15 provides a magnified elevation view of a portion of the example agitation element of FIG. 3, wherein the extended post is in an expanded position.

As shown, such as in FIGS. 7 and 14, column spring 192 (e.g., compression spring) may be provided about the connector column 140. The column spring 192 may be disposed about the connector column 140 in upwardly biasing engagement therewith. Moreover, the column spring 192 may be disposed radially between the shader collar 142 and the connector column 140. One (e.g., upper) end of the column spring 192 may be in engagement with the connector column 140 (e.g., at column flange 190) while another (e.g., lower) end of column spring 192 is in engaged with shader collar 142 (e.g., at column flange 190). When assembled, column spring 192 may bias separation or axial expansion between the shader collar 142 and connector column 140.

Turning especially to FIGS. 7 through 17C, axial movement of the connector column 140 (e.g., as provided by a user pressing extended post 130 against the impeller base 120) may advantageously effectuate locking or unlocking of extended post 130 on impeller base 120. In particular, a single push or press from a user may serve to advantageously lock or unlock the extended post 130 from impeller base 120 (e.g., to enable assembly or disassembly of the entire post 130 from the wash chamber). For instance, from an unlocked position, the mating face 154 may be aligned with the mounted face such that the locator wing 166 is within the vertical segment of the mounting channel 158 and the bottom end 136 (e.g., at interior flange 188) of shader collar 142 rests on a top face of central bracket 156). From such a position, the extended post 130 may be pressed downward, driving connector column 140 toward impeller base 120 and forcing movement of connector column 140 relative to the shader collar 142, which is prevented from moving downward by the interaction with the central bracket 156. As the connector column 140 moves axially downward, it may also be forced to rotate (e.g., clockwise as directed by interaction of cam groove 146 and follower pin 148). In turn, the locator wing 166 may rotate along the horizontal portion of the mounting channel 158. Subsequently, the pressing force on the extended post 130 may be released, permitting the column spring 192 to expand the extended post 130 to rest the follower pin 148 within the upper seat 178. This may notably provide the extended post 130 in a locked position. A second pressing of the extended post 130 (e.g., by a user) may cause the follower pin 148 to lift from the upper seat 178 and travel downward when the pressing force is released and to the right bottom seat 176 (e.g., while rotating counterclockwise as directed by the cam groove 146). Thus, the extended post 130 may be returned to an unlocked position (e.g., permitting removal of extended post 130 from impeller base 120).

Returning generally to FIGS. 3 through 14, some embodiments of extended post 130 include the auger cap 144. In certain embodiments, the auger cap 144 selectively covers the connector column 140. Thus, the auger cap 144 may be removed from and reattached to connector column 140 (e.g., manually by a user). In some embodiments, auger cap 144 covers the top portion of the connector column 140 and defines the top end 134 of extended post 130. Generally, auger cap 144 provides an outer surface for extended post 130 and, as noted above, may include one or more fins (e.g., not pictured in FIGS. 3 through 14) extending therefrom. Notably, the auger cap 144 may be engaged (e.g., pressed by a user) for locking or unlocking post 130 (e.g., as described above).

Figure 3:
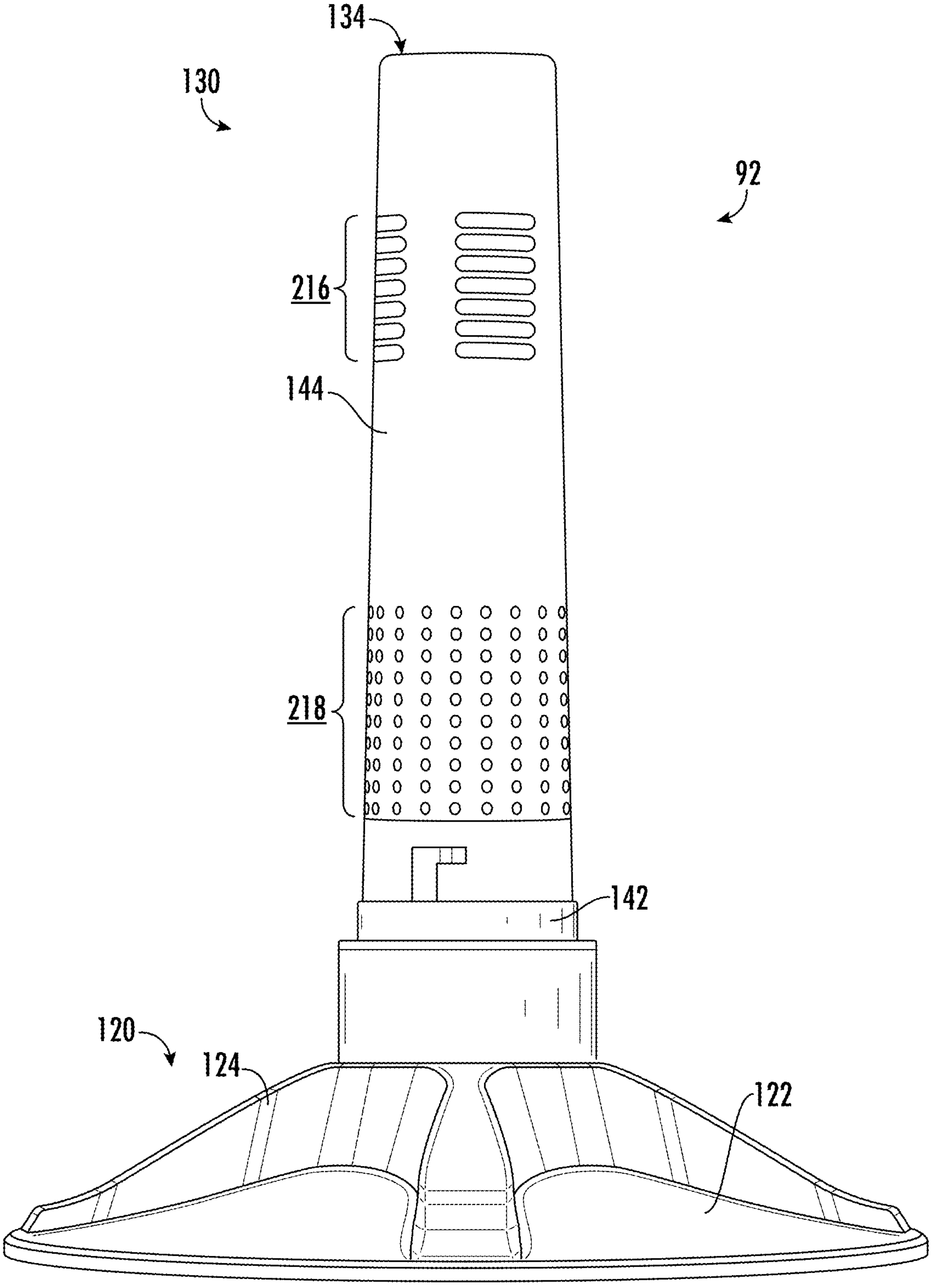
FIG. 3 provides an elevation view of an agitation element, in isolation, according to example embodiments of the present disclosure.
Figure 4:
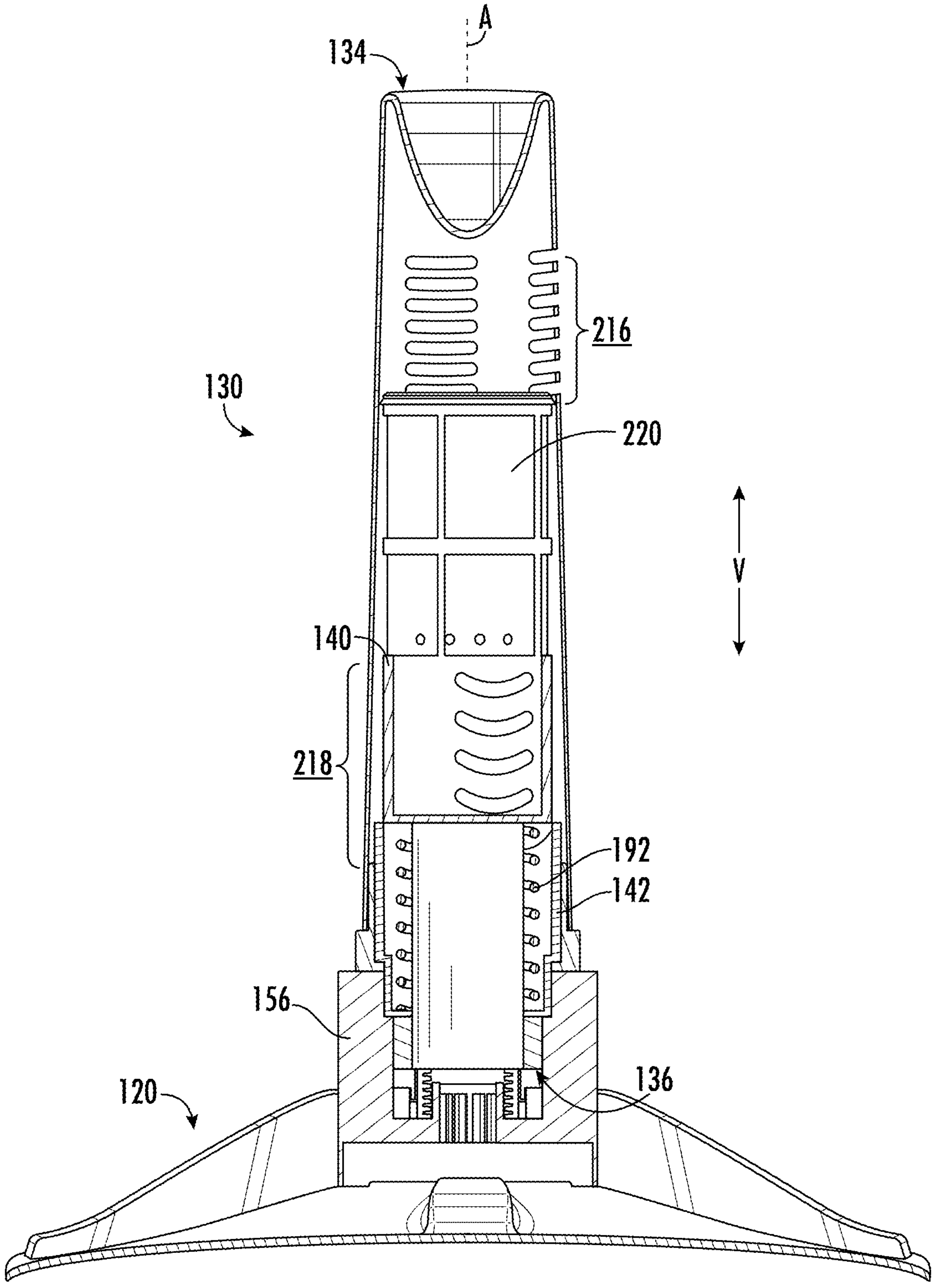
FIG. 4 provides a sectional view of the example agitation element of FIG. 3.
Figure 5:
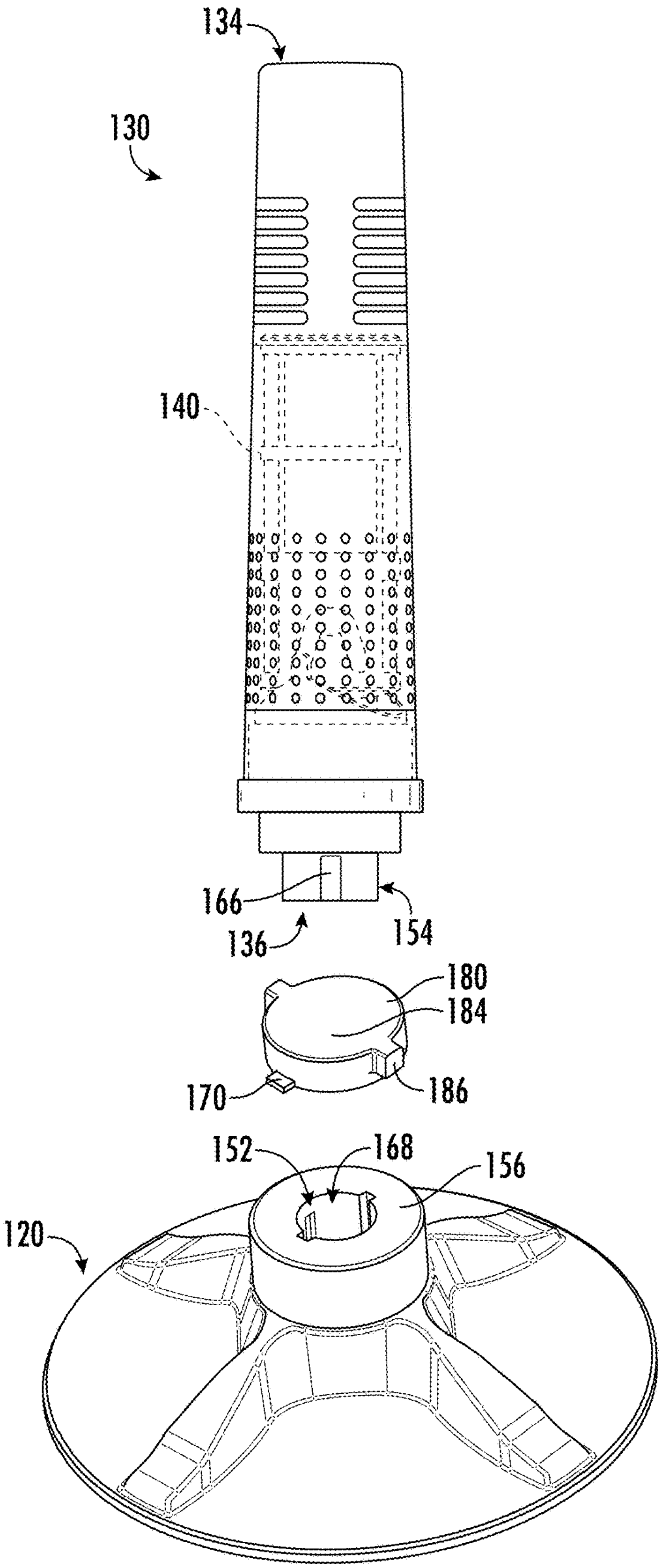
FIG. 5 provides an exploded perspective view of the example agitation element of FIG. 3.
Figure 6:
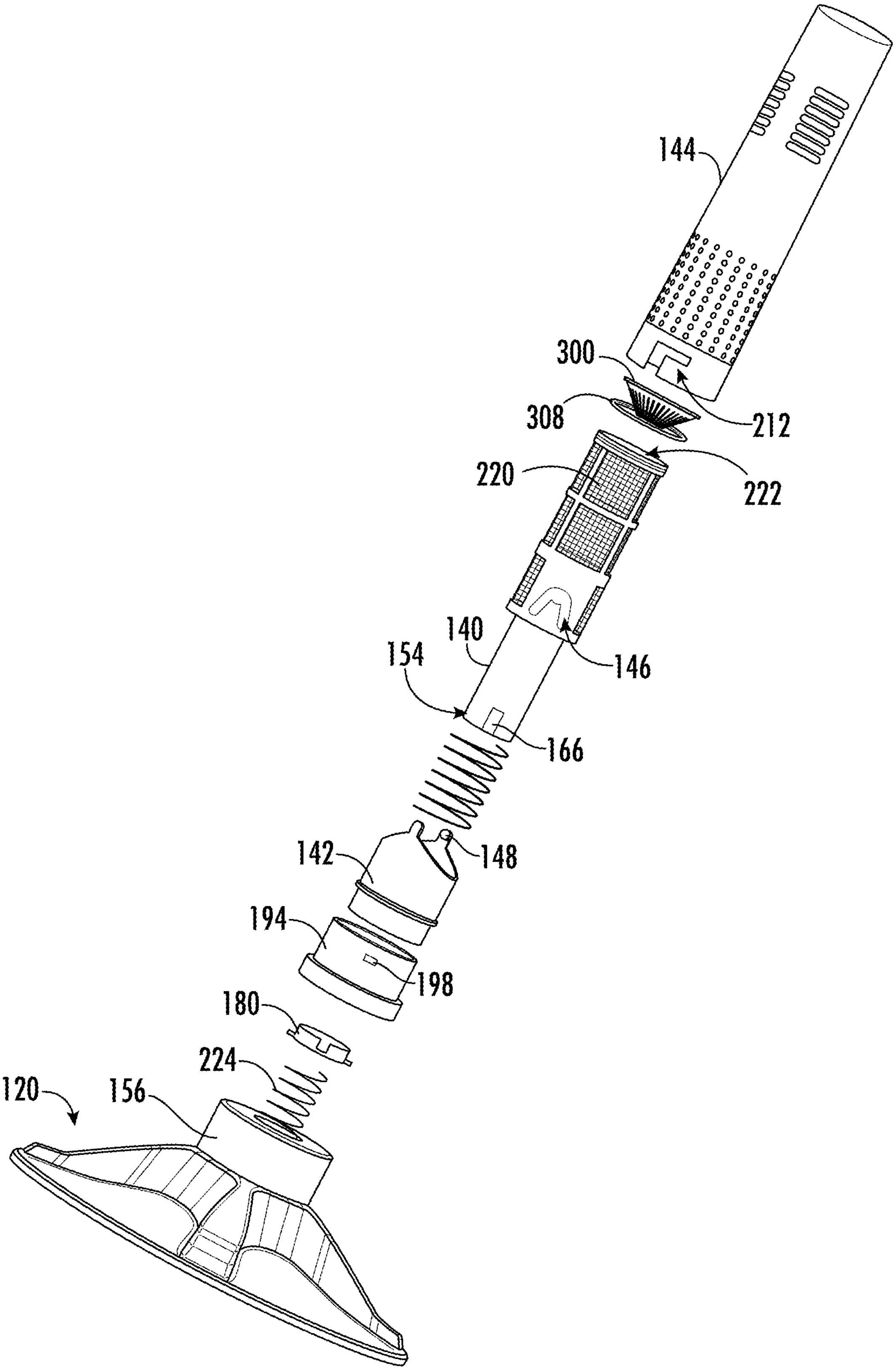
FIG. 6 provides another exploded perspective view of the example agitation element of FIG. 3.

As shown in FIG. 3, auger cap 144 may generally include an inlet 216 and an outlet 218 providing an entrance and an exit for liquid through the auger cap 144. In general, inlet 216 may be positioned above, in the vertical direction V, outlet 218, e.g., liquid may flow into inlet 216, downwards through within extended post 130, and out of outlet 218. As may be seen FIG. 6, extended post 130 may include a trap 300 positioned at top end of connector column 140 and a seal 308. Generally, seal 308 may be positioned between trap 300 and a top side 221 of the filtration wall 220. In general, seal 308 may sealingly engage auger cap 144 such that liquid entering inlet 216 may flow through trap 300 and into the filter chamber 222, before flowing through filtration wall 220 and exiting through outlet 218. As such, during operational cycles of washing machine appliance 50, liquid may be filtered through extended post 130. Trap 300 will be described in further detail below.

An auger collar 194 may be provided separate from or in addition to auger cap 144. In particular, auger collar 194 may be disposed about connector column 140 (e.g., above mating face 154). For instance, auger collar 194 may be provided radially outward from shader collar 142. In some such embodiments, auger collar 194 may be slidably disposed on shader collar 142. Shader collar 142 may include an upper segment defining an upper diameter and a lower segment defining a lower diameter less than the upper diameter of the upper segment. In turn, an annual shoulder 196 may be defined between the upper segment and the lower segment. A circumferential lip 197 (e.g., extending radially inward) may be disposed about the lower segment in selective axial contact with the annual shoulder 196. Notably, auger collar 194 may be secured relative to shader collar 142 (e.g., and thereby connector column 140).

Auger collar 194 may provide an anchor or connection portion for attaching auger cap 144 to connector column 140. In some embodiments, auger collar 194 includes a connection tab 198 that extends radially outward from a base ring of auger collar 194. Auger cap 144 may define an L-shaped slot 212 within which the connection tab 198 is received (e.g., to attach auger cap 144). Specifically, the L-shaped slot 212 may define an L-shaped path having a vertical leg and a horizontal leg along which the connection tab 198 may slide. The vertical leg of the L-shaped slot 212 may be axially open (e.g., in a downward direction) to permit the connection tab 198 while the horizontal leg of the L-shaped slot 212 may be closed (e.g., at a distal end from the vertical leg) to restrict or delimit the permitted rotation of auger cap 144 relative to auger collar 194. Thus, attachment of auger cap 144 to connector column 140 may require vertically inserting a connection tab 198 into a L-shaped slot 212, driving auger cap 144 vertically downward, then rotating auger cap 144 about the rotation axis A and along the horizontal leg. Attachment of auger cap 144 to connector column 140 may notably ensure the axial force or pressing from a user is transferred to connector column 140 (e.g., to effectuate locking or unlocking with a single press, as described above).

Figure 18:
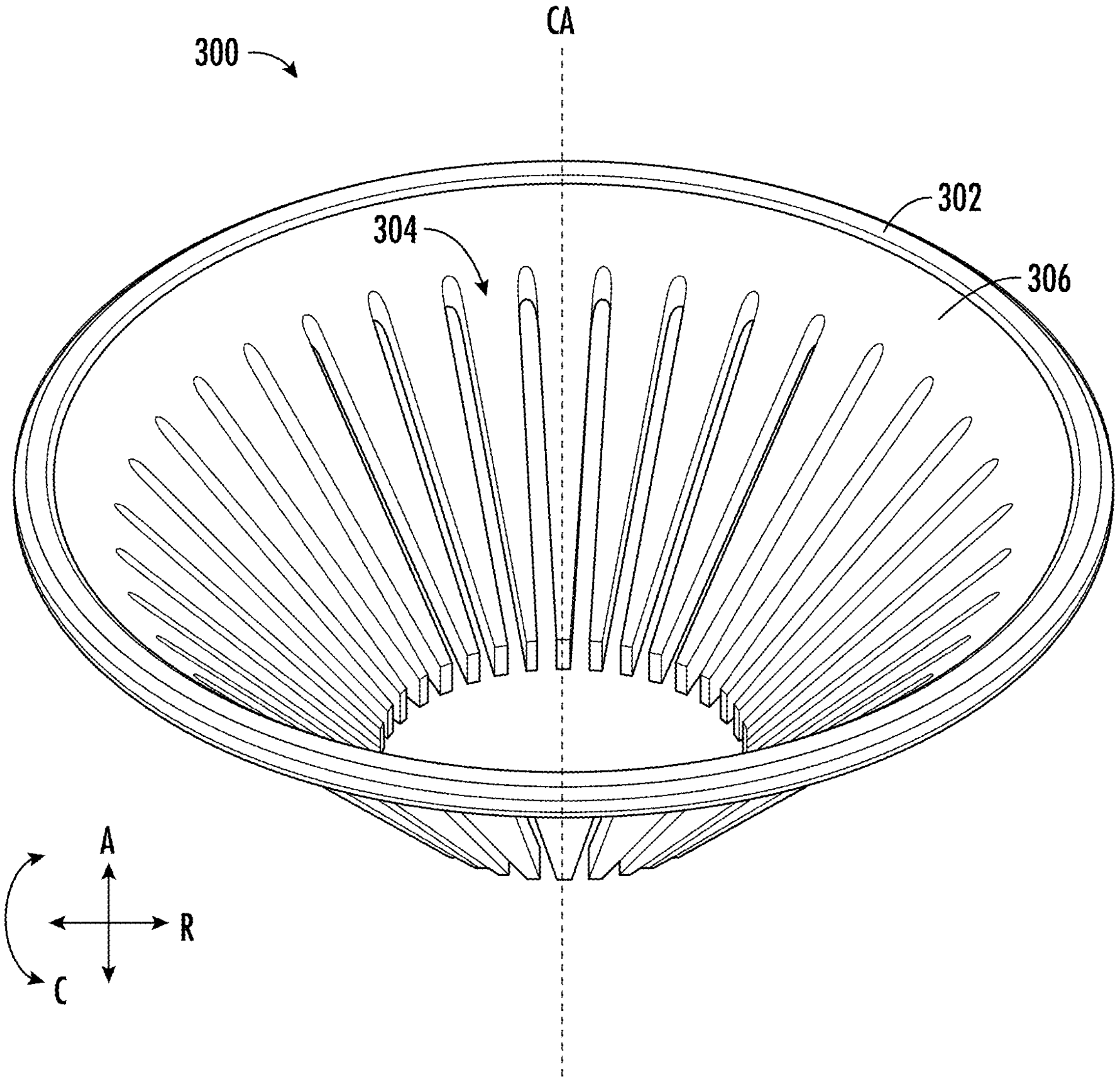
FIG. 18 provides a perspective view of an example trap of the example agitation element of FIG. 3, according to example embodiments of the present disclosure.
Figure 19:
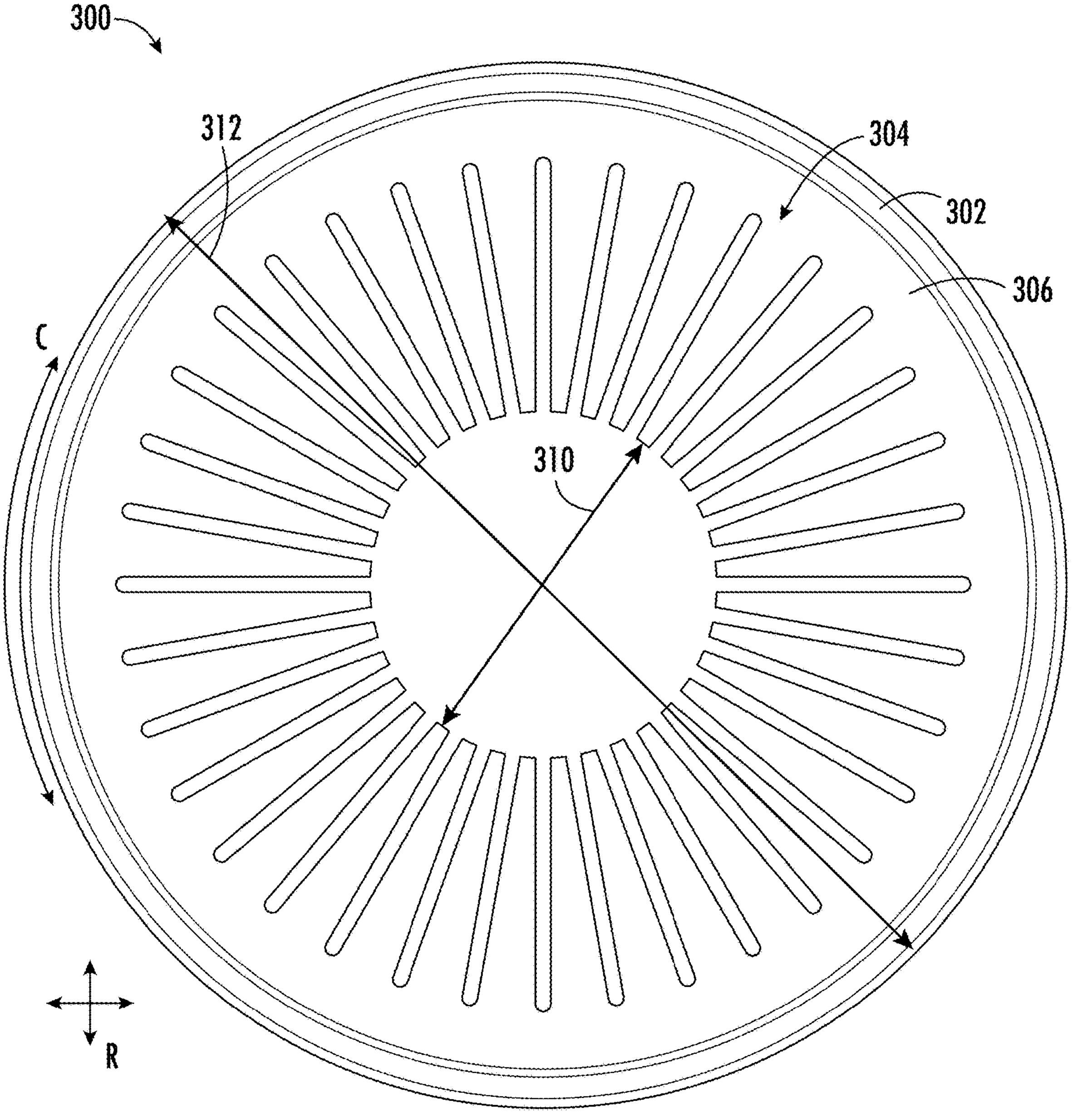
FIG. 19 provides a top view of the example trap of FIG. 18.
Figure 20:
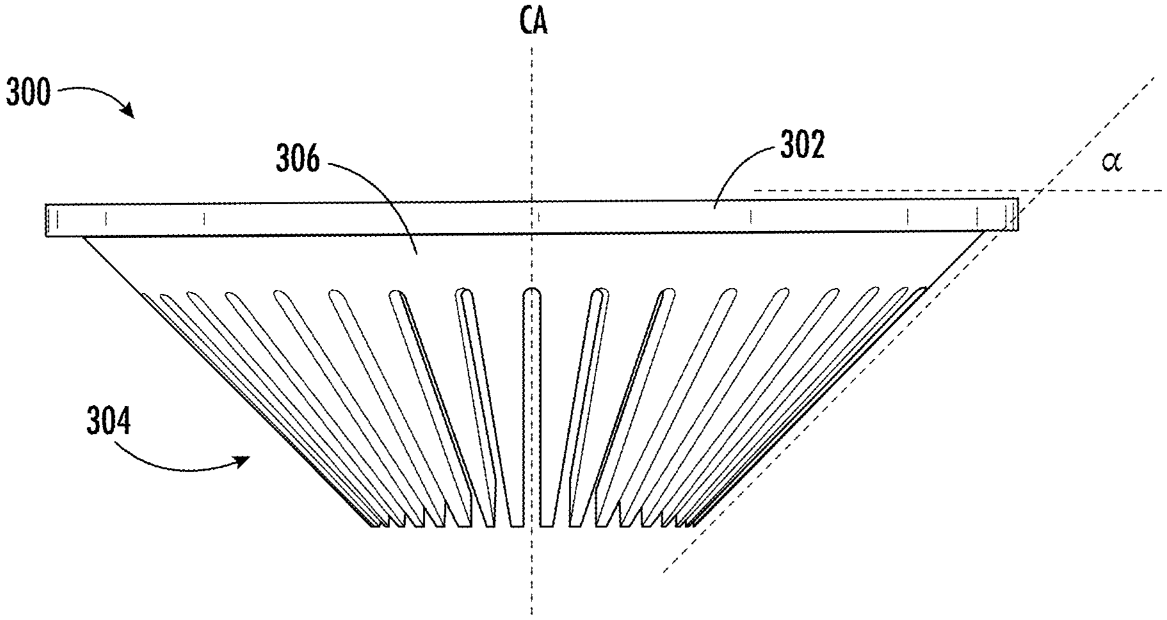
FIG. 20 provides a side view of the example trap of FIG. 18.

Turning now to FIGS. 18 through 20, provided are views of one example embodiment of a trap 300. In particular, FIG. 18 provides a perspective view of an example trap 300, FIG. 19 provides a top view of the example trap 300, and FIG. 20 provides a side view of the example trap 300. Trap 300 may generally be configured for trapping, or reducing, foreign particles from backflowing through inlet 216 of auger cap 144.

In general, trap 300 may include a rim 302, a funnel 306, and an array of prongs 304. Rim 302 may generally extend around a circumferential direction, such as around a central axis CA. Rim 302 may be generally configured to sealingly engage top side 221 of filtration wall 220, e.g., with seal 308 positioned therebetween. In general, the array of prongs 304 may be defined by funnel 306. In particular, trap 300 may include the array of prongs 304 around rim 302, and may generally be pointed inwards, such as towards central axis CA of trap 300. Funnel 306 may generally define an oblique angle α at which the array of prongs 304 are angled. For example, each prong of the array of prongs 304 may be positioned at angle α, with respect to the vertical direction V, from rim 302 towards the central axis, e.g., angle α may be any suitable angle between ten degrees (10°) and eighty degrees (80°) such as between twenty degrees (20°) and seventy degrees (70°), such as between thirty degrees (30°) and sixty degrees (60°).

As may be seen in FIG. 19, the plurality of prongs 304 may be spaced around rim 302. In particular, each prong of the array of prongs 304 may be equidistantly spaced with respect to the circumferential direction C. In general, trap 300 may define an outer diameter 312, e.g., outer diameter 312 may be approximately equal to a diameter (not labeled) of column connector 140. In some example embodiments, the array of prongs 304 may define an inner diameter 310. Inner diameter 310 may generally be an opening for liquid to flow therethrough, e.g., liquid may be funneled by funnel 306 and the array of prongs 304 thereof (e.g., angled with the flow of liquid) through the opening defined by inner diameter 310. In scenarios where liquid is pushed back through trap, i.e., from below, angle α of funnel 306 and the array of prongs 304 (e.g., angled against the flow of liquid) may catch foreign particles, thus reducing a backflow of foreign particles into basket 70 of washing machine appliance 50.

In other words, during a washing operation or wash cycle, liquid within basket 70 of washing machine appliance 50 may be received by inlet 216 of extended post 130 (e.g., auger cap 144), wherein the liquid flows through trap 300 into filtration chamber 222, then through filtration wall 220, and out of outlet 218 of extended post 130 (e.g., auger cap 144). Foreign particles separated from the liquid may generally be held within filtration chamber 222. In the case of liquid flowing back through outlet 218, trap 300 (e.g., via funnel 306 and the array of prongs 304 thereof) may generally reduce the backflow of foreign particles from inlet 216 into basket 70 of washing machine appliance 50. Additionally, seal 308 may restrict liquid from flowing around trap 300, such between trap 300 and auger cap 144. Additionally or alternatively, when extended post 130 is removed from wash chamber 73, trap 300 may be removed and filtration chamber 222 of connector column 140 may be cleaned out or emptied.

As may be seen from the above, a laundry appliance may include a filter built into the auger and configured to capture foreign particles. The filter may be integrated into the auger assembly, with water entering through an inlet and flowing through the filter chamber, where foreign particles are trapped. The water may then exit through an outlet in the auger. The auger assembly may include a filtration wall, a seal ring for sealing between the filtration wall and auger, and a trap to reduce a reverse flow of particles into the appliance. During wash and/or rinse cycles, water may be pushed through the auger inlet and filtered, with the trap restricting particles from re-entering the appliance. Additionally, a user may clean the filter after each wash by removing an auger cover and accessing the filter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance, comprising:

a tub;

a basket rotatably positioned within the tub;

an impeller base rotatably mounted within the basket and defining a rotation axis, the impeller base comprising one or more impeller fins extending radially outward from the rotation axis, and a mounting face disposed radially inward from the one or more impeller fins, the mounting face comprising a central bracket defining a mounting channel having an axial portion and a radial portion extending along the mounting face;

an impeller cap slidably seated within the central bracket and biased upwardly; and an extended post removably attached to the impeller base and configured to rotate therewith, the extended post defining an inlet and an outlet, the extended post comprising:

a connector column extending along the rotation axis between a bottom end proximal to the impeller base and a top end distal to the impeller base, the connector column comprising a filtration wall defining a filtration chamber, a shader collar disposed about the connector column, and a trap positioned at the top end of the connector column.

2. The washing machine appliance of claim 1, wherein the trap defines a rim configured to sealingly engage a top side of the filtration wall.

3. The washing machine appliance of claim 2, wherein the trap comprises an array of prongs around the rim, the array of prongs pointed generally inwards towards a central axis of the trap.

4. The washing machine appliance of claim 3, wherein each prong of the array of prongs is positioned at an oblique angle from the rim towards the central axis.

5. The washing machine appliance of claim 2, further comprising an auger cap selectively covering the connector column.

6. The washing machine appliance of claim 5, further comprising a seal positioned between the trap and the top side of the filtration wall, the seal configured to sealingly engage the auger cap.

7. The washing machine appliance of claim 5, further comprising an auger collar disposed about the connector column.

8. The washing machine appliance of claim 7, wherein the auger cap is selectively attached to the auger collar.

9. The washing machine appliance of claim 1, wherein the shader collar is axially slidable on the connector column.

10. The washing machine appliance of claim 1, further comprising a column spring disposed about the connector column in upwardly biasing engagement therewith, the column spring being disposed radially between the shader collar and the connector column.

11. A washing machine appliance comprising:

a tub;

a basket rotatably positioned within the tub;

an impeller base rotatably mounted within the basket and defining a rotation axis; and an extended post removably attached to the impeller base and configured to rotate therewith, the extended post defining an inlet and an outlet, the extended post comprising:

a connector column extending along the rotation axis between a bottom end proximal to the impeller base and a top end distal to the impeller base, the connector column comprising a filtration wall defining a filtration chamber, a shader collar disposed about the connector column, and a trap positioned at the top end of the connector column.

12. The washing machine appliance of claim 11, wherein the trap defines a rim configured to sealingly engage a top side of the filtration wall.

13. The washing machine appliance of claim 12, wherein the trap comprises an array of prongs around the rim, the array of prongs pointed generally inwards towards a central axis of the trap.

14. The washing machine appliance of claim 13, wherein each prong of the array of prongs is positioned at an oblique angle from the rim towards the central axis.

15. The washing machine appliance of claim 12, further comprising an auger cap selectively covering the connector column.

16. The washing machine appliance of claim 15, further comprising a seal positioned between the trap and the top side of the filtration wall, the seal configured to sealingly engage the auger cap.

17. The washing machine appliance of claim 15, further comprising an auger collar disposed about the connector column.

18. The washing machine appliance of claim 17, wherein the auger cap is selectively attached to the auger collar.

19. The washing machine appliance of claim 11, wherein the shader collar is axially slidable on the connector column.

20. The washing machine appliance of claim 11, further comprising a column spring disposed about the connector column in upwardly biasing engagement therewith, the column spring being disposed radially between the shader collar and the connector column.

* * * * *